Fig.1

3,199,647
CONTROL VALVE MEANS FOR FORWARD AND
REVERSE CLUTCHES
Donald C. Staab, Long Lake, Minn., assignor, by mesne
assignments, to Minneapolis-Moline, Inc., Hopkins,
Minn., a corporation of Delaware
Filed Aug. 21, 1962, Ser. No. 218,345
11 Claims. (Cl. 192—87)

This invention relates to a transmission control system and more particularly to a control system for controlling the hydraulically actuated forward and reverse clutches of an industrial truck which serves to connect the transmissions of the truck with the engine-driven torque converters of such trucks.

In industrial trucks of the particular type controlled by the present invention, such as fork lift trucks, the engine drives the impeller of the torque converter as well as a pump for a hydraulic circuit which usually incorporates tilting and lifting rams for tilting, lifting, and otherwise manipulating a load. A transmission valve pump is also driven by the engine for supplying fluid under pressure to a transmission control valve that in turn controls the operation of hydraulically controlled forward and reverse clutches for the transmission. Thus, the engine drives the torque converter which in turn drives the transmission to propel the truck forwardly or rearwardly depending on which of the two clutches has been actuated. The two clutches are, in turn, actuated under control of the operator through the transmission control valve and utilizing the power produced by the small transmission valve pump.

In a truck of the class described, when the operator moves the usual control lever into forward position, the transmission valve actuates the forward clutch to place the transmission in forward drive. As the engine is accelerated, the truck moves forwardly in accordance with the speed of the engine. If the operator wishes to go slowly, the engine is driven at a very slow rate.

In utilizing such a truck, it is often found necessary to tilt or lift at a high speed while slowly moving or inching the truck forwardly or rearwardly. This means that the engine of the truck must be operated at high speed in order to obtain the rapid tilting or lifting while the truck is inched along at a very slow speed. To provide for this slow inching movement of the truck while the motor is being operated at a high speed, the hydraulic pressure on the clutches may be varied to allow controlled slippage of the clutch.

It has heretofore been customary to supply lubricating fluid to the lubricating system of the truck from the transmission valve pump or other pump which serves to control the transmission clutches. The lubricating system of the truck is designed for a very low pressure supply while the pump supplying the transmission control system must provide a relatively higher pressure, for example, in the range of one hundred ninety pounds per square inch, for controlling the transmission clutches. The lubricating system of the truck offers only a low resistance to the hydraulic fluid and would consume the entire output of the transmission valve pump if unrestricted. Accordingly, some system of priority is required in the transmission control system so that the high pressure of the pump becomes available for the actuation of the transmission clutches while a lower pressure hydraulic fluid is substantially continuously supplied to the lubricating system of the truck.

It has heretofore been proposed to combine an inching control system with the service brake of the truck whereby initial actuation of a brake lever will be effective to actuate the inching control system to inch the truck, while applying a slight braking effect to the service brake of the truck. Further actuation of the transmission control system is then effective to disengage the inching control system and to apply the service brake of the vehicle.

None of the prior systems of inching control has been entirely satisfactory. Certain systems have required separate controls to apply the inching arrangement and separate controls for selecting the forward or reverse clutch. Other systems have been unsatisfactorily tied in with the service brake system of the vehicle.

Accordingly, it is an object of the present invention to provide a new and improved transmission control system.

A further object of the present invention is to provide a new and improved transmission control system wherein the hydraulic pressure on the transmission clutches may be gradually and accurately varied to provide for controlled slippage of the clutches.

A further object of the present invention is to provide an improved transmission control system wherein the hydraulic pressure supplied to the transmission clutches is regulated by spring means.

Further objects and advantages of this invention will become apparent as the following description proceeds and the features of novelty which characterize the invention will be pointed out with particularity in the claims annexed to and forming a part of this specification.

Briefly stated, in accordance with the present invention, there is provided an improved trnasmission control system for use with an industrial truck of the type having forward and reverse fluid-actuated clutches controlled by a hydraulic transmission valve pump driven by the engine of the truck. The transmission control system includes a transmission control valve assembly for selectively controlling the actuation of the clutches. Hydraulic fluid under pressure is supplied from the transmission valve pump to the transmission control valve and the transmission control valve is provided with a clutch control member for selectively connecting the forward or reverse clutches to the source of fluid supply. Spring means are provided in the transmission control valve for providing an incremental hydraulic loading of the selected clutch as a function of the actuation of the clutch control member.

More specifically, according to a preferred embodiment of the invention, the transmission control valve includes a valve housing forming a valve chamber including a valve cylinder and enclosing a valve element slidably mounted in the cylinder. A first passageway in the valve housing communicates with the valve cylinder and is adapted for connection to the transmission valve pump. The valve element divides the valve cylinder into a pair of spaced expandable chambers. Passageway means extend through the valve element and connect the fluid inlet passageway with the expandable chambers. Additional passageways extending from each of the expandable chambers are adapted for connection to the lubricating system of the truck. Each expandable chamber includes a fluid port which is at least partially closed upon movement of the valve element in a direction to contract the chamber. However, when the fluid port is even partially closed, the fluid pressure in the contracted chamber, which is connected to the fluid inlet passageway, will build up and will tend to expand the chamber to open the fluid exhaust port. Each of the expandable chambers are effective to transmit their pressure build-up to a respective one of the forward and reverse clutches and accordingly to incrementally load the particular clutch hydraulically in relation to the compression of the restraining spring. Spring means are provided resiliently restraining the expansion of the contracted chamber so as to permit the exhaust port to open at least partially when the pressure in the associated expandable chamber builds up to an equilibrium condition balanced by the restraining force of the spring means. The force of the spring means, of course, is a function of the distance through which the spring is compressed and this distance is accurately controllable by the clutch control element. Movement of the clutch control element to an extreme position in either direction is effective to apply the full pump pressure to the associated clutch and, accordingly, the clutch may be hydraulically loaded to any amount from a zero loading to the maximum output pressure of the transmission valve pump by the mere continuous movement of the clutch control element, under the control of the clutch pressure spring.

The nature of the invention will best be understood when described in connection with the accompanying drawings, in which.

Figure 1:
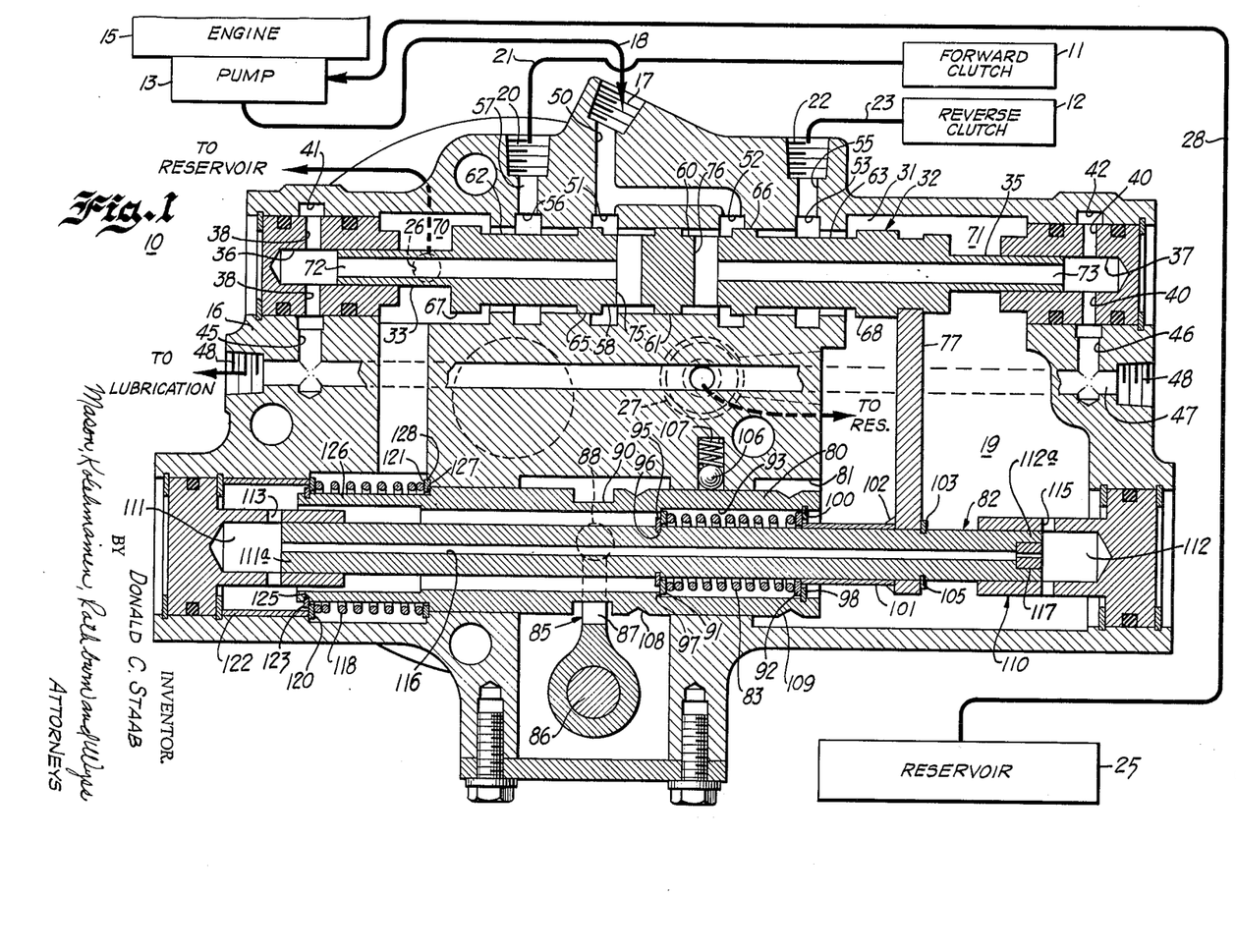
FIG. 1 is a somewhat schematic illustration of a transmission control system according ot the present invention and illustrating the transmission control valve in cross section in a neutral position.
Figure 2:
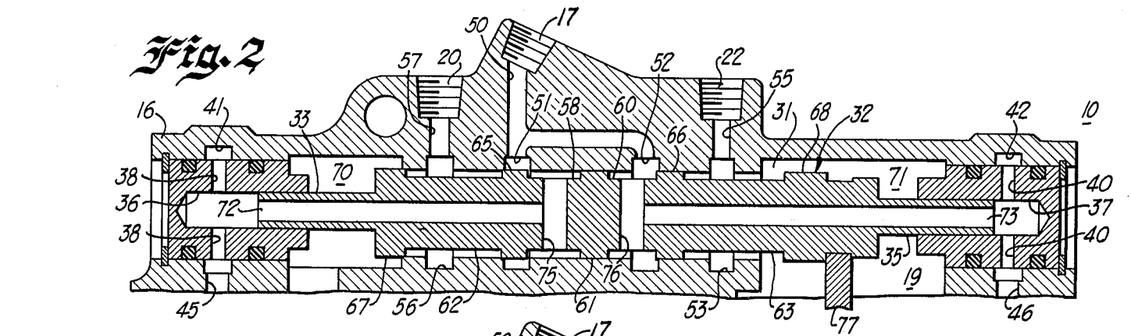
FIG. 2 is a fragmentary cross-sectional view of the improved transmission valve of FIG. 1 illustrated in an intermediate one of its operating positions.
Figure 3:
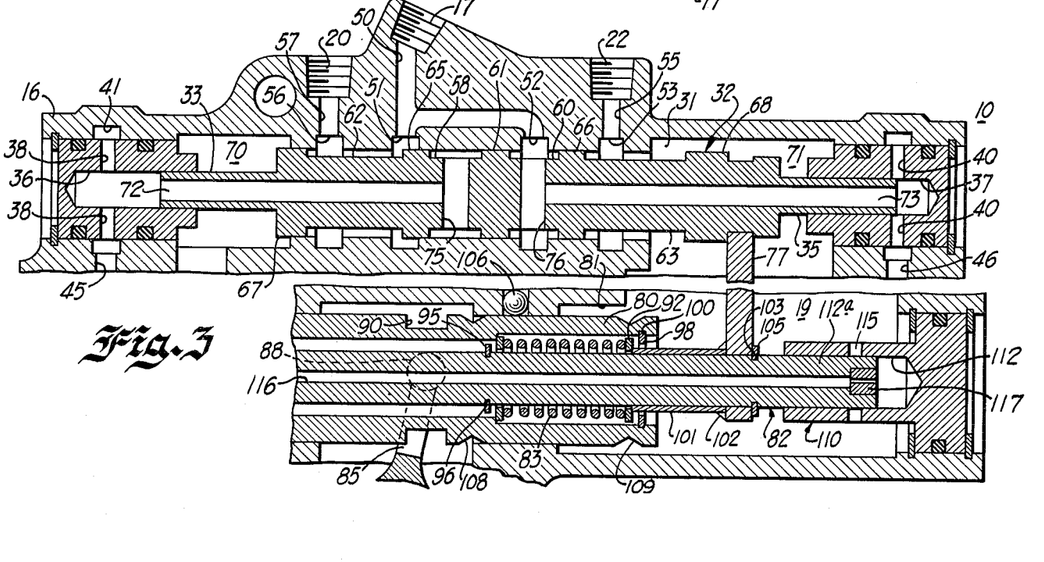
FIG. 3 is a fragmentary cross-sectional view of the improved transmission control valve illustrated in FIG. 1, and illustrated in yet another of its operating positions.

Referring now to the embodiment of FIGS. 1 to 3, there is illustrated a transmission control system according to the present invention and embodying a transmission control valve generally shown at 10 for controlling a hydraulic forward clutch 11 and a hydraulic reverse clutch 12. To provide hydraulic fluid under pressure, for example, in the range of 190 p.s.i. to the transmission control valve 10, there is provided a transmission valve pump 13 drivingly connected to be driven by an engine 15 forming the prime mover of the vehicle (not shown). It will be appreciated that the system may be embodied in an industrial truck of the type employing a hydraulic fork to lift or tilt a load and that it becomes necessary to run the engine 15 at high speed in order to supply the motivating force to the vehicle lift fork, while, at the same time, inching the vehicle along for proper placement and location of the load. Moreover, the engine is connected to drive the vehicle through the forward clutch 11 and reverse clutch 12 which, in turn, are operatively associated with the transmission of the vehicle to provide the coupling of the engine to the vehicle drive when hydraulic fluid under pressure is supplied to a selected one of the clutches 11, 12. Moreover, the driving torque transmitted by the clutch from the engine 15 to the transmission of the vehicle will be a function of the hydraulic pressure supplied to the clutch. When full pressure from the pump 13 is provided to one of the clutches 11 or 12, the clutches will perform as a direct coupling of the engine and transmission, but when a reduced pressure only is supplied to the respective clutch 11 or 12, the clutch will slip making it possible to inch the vehicle even though the engine 15 is operating at a high r.p.m. It is understood that the engine 15 may be connected to the transmission of the vehicle through a hydraulic coupling or converter.

In order to connect the valve 10 into the transmission control system of the vehicle, the valve 10 is provided with a valve housing 16 forming a valve chamber 19 and containing a fluid inlet fitting 17 adapted to be connected to the transmission valve pump 13 through a fluid conduit or passageway 18. Moreover, the forward clutch is adapted to be connected to a forward clutch fitting 20 through a fluid conduit or passageway 21 and the reverse clutch 12 is adapted to be connected to a reverse clutch fitting 22 of the control valve 10 through a fluid conduit or passageway 23. Moreover, there is provided a fluid reservoir shown schematically at 25 connected to receive hydraulic fluid from a fluid drain 26 communicating with the chamber 19 and additionally connected to receive excess fluid from the lubricating system of the vehicle which is discharged from a lubrication release valve 27. A fluid conduit or passageway 28 connects the inlet of the pump 13 to the reservoir 25 so that the pump 13 may draw hydraulic fluid from the reservoir 25 and supply this fluid under pressure to the fluid inlet fitting 17 of the control valve 10.

To provide for the selective actuation of the forward and reverse clutches 11 and 12 through an incremental pressure loading, and to make the surplus hydraulic fluid supplied by the pump 13 which is not required for operation of the forward and reverse clutches 11 and 12 available to the lubricating system of the vehicle, the valve chamber 19 is provided at its upper end with a valve cylinder 31 reciprocably receiving a valve element 32. The valve cylinder 31 is provided with a plurality of fluid ports hereinafter described, and the valve element 32 is provided with a plurality of rings or annular recesses which form fluid passageways, hereinafter described, to control the admission and discharge of fluid to the clutches 11 and 12. Additionally, the valve element 32 is provided with reduced diameter end or piston portions 33 and 35 which are reciprocally received in expandable chambers 36 and 37, respectively, formed in opposed ends of the valve cylinder 31. The chambers 36 and 37 are closed at one end and the reduced diameter portions 33 and 35 form sort of piston member reciprocable within the expandable chamber members 36 and 37. Each of the expandable chambers are provided with a plurality of circumferentially aligned lubricating fluid ports 38 and 40, respectively, which are in communication with annular lubricating manifolds 41 and 42, respectively. The lubricating fluid ports 38 and 40 are positioned in the side walls of the expandable chambers 36 and 37 at a location where reciprocation of the valve element 32 is effective to close the respective ports when the piston portions 33 and 35 move over the ports 38 and 40.

To connect the excess hydraulic fluid from the control valve 10 to the lubricating system of the vehicle, the housing 16 is provided with a plurality of passageways 45, 46 and 47 which communicate with the lubricating manifolds 41 and 42 and discharge to one or more lubricating fittings 48. It is understood that the lubricating system of the vehicle may be connected to the lubricating fittings 48 by any suitable conduit means (not shown). Moreover, as heretofore described, the lubrication of the vehicle takes place at a very low pressure. Accordingly, in order to prevent a build-up of hydraulic pressure to the lubricating system and to provide for the discharge of any excess lubricating fluid supplied to the lubricating passageways 45, 46 and 47, the lubricating release valve 27 is connected to one of the lubricating passageways, here shown as passageway 47. The lubrication release valve 27 discharges into the reservoir 25 when the pressure in the lubricating system exceeds the preselected pressure setting of the lubrication release valve 27.

To provide for hydraulic fluid to the lubricating conduits of the valve 10 and to the selected one of the forward or reverse clutches 11 and 12 at the preselected pressure, the inlet fluid to the control valve 10 passes through an inlet passageway 50 to a pair of spaced inlet ports 51 and 52 in the form of annular grooves in the wall of the valve cylinder 31. Additionally, the wall of the valve cylinder 31 is provided with a forward clutch port 56 in the form of an annular recess therein, which communicates with the reverse clutch fitting 22 through a reverse clutch fluid passageway 55. Similarly, the wall of the valve cylinder 31 is provided with a forward clutch port 56 in the form of an annular recess in the wall thereof which communicates with the forward clutch fitting 20 through a forward clutch fluid passageway 57. The reverse clutch port 53, and forward clutch port 56 are spaced on opposite sides of the spaced inlet ports 51 and 52. Moreover, the valve element 32 is provided with a pair of spaced apart annular grooves 58 and 60 forming inlet fluid passageways and spaced apart by a ring-shaped portion 61 which prevents the flow of hydraulic fluid between the respective passageways 58 and 60. Spaced outwardly of the passageways 58 and 60 is an additional pair of annular grooves 62 and 63 forming clutch control passageways. A pair of annular ring-shaped portions 65 and 66 separate the respective fluid passageways 58 and 62, and 60 and 63. Additionally, outwardly of the clutch control passageways 62 and 63, there is formed additional ring-shaped portions 67 and 68, respectively, on the valve element 32. The ring-shaped portions 61, 65, 66, 67 and 68 form a close sliding fit with the cylindrical inner wall of the valve cylinder 31 so as to prevent leakage of fluid past them when they separate various ones of the ports 51, 52, 53 and 56. Additionally, the valve cylinder 31 is provided adjacent the expandable chambers 36 and 37 with enlarged open port portions 70 and 71 which are open to the valve chamber 19 and, accordingly, are in communication with the fluid drain 26.

To complete the path for lubricating fluid through the control valve 10, the valve element 32 is provided with a pair of axial lubricating passageways 72 and 73 extending inwardly from each end thereof, opening in the respective expandable chambers 36 and 37, and communicating with radial lubricating passageways 75 and 76.

It will be appreciated from the above description of the valve cylinder 31 and valve element 32 that these elements form a pair of substantially identical opposed control portions except for the addition of a control link 77 to the right-hand side of the valve element 32, as viewed in FIG. 1. In other words, the sets of rings and passageways on the left of the valve element 32 control the admission and pressure of fluid to the forward clutch while a similar set of rings and passageways are provided on the right of valve element 32 to control the fluid and pressure of fluid to the reverse clutch 12.

From the foregoing description, it will be seen that when the valve element 32 is in a neutral position, as illustrated in FIG. 1, lubricating fluid is supplied to the lubricating system of the vehicle through inlet fitting 17, inlet passageway 50, spaced inlet ports 51 and 52, radial lubricating passageways 75 and 76, axial lubricating passageways 72 and 73 expandable chambers 36 and 37, lubricating fluid ports 38 and 40, lubricating manifolds 41 and 42, passageways 45, 46 and 47, and lubricating fittings 48. Any excess fluid supplied to the lubricating system will be dumped from the lubricating system through the lubrication relief valve 27 and returned to the reservoir 25. Since the lubricating system of the vehicle operates at relatively low pressure, the release valve 27 will be set at a relatively low pressure and the lubricating system will not permit a build-up of fluid pressure in the control valve 10. At the same time, when the valve element 32 is in the neutral position, the forward clutch is discharged to the reservoir through the fluid conduit 21, forward clutch fitting 20, forward clutch passageway 57, forward clutch port 56, clutch control passageway 62, and enlarged open portion 70 which communicates with the valve chamber 19 and discharges through the drain 26. At the same time, the reverse clutch 12 discharges to the reservoir 25 through the fluid conduit 23, the reverse clutch fitting 22, the reverse clutch fluid passageway 55, reverse clutch port 53, clutch control passageway 63, and enlarged open portion 71 of the valve cylinder 31 which communicates with the valve chamber 19, and discharges through the fluid drain 26 into the reservoir 25. It will be seen that in this neutral position, the ring-shaped portion 66 separates the inlet port 52 from the reverse clutch port 53 and that the ring-shaped portion 65 separates the inlet port 51 from the forward clutch port 56. Accordingly, in this position no fluid is being supplied to either of the clutches and the clutches have been dumped to the reservoir so that the vehicle transmission is in a neutral position. Moreover, the ring 61 at all times separates the ports 51 and 52 regardless of the position of the valve element 32.

Movement of the valve element 32 in either direction from the neutral position illustrated in FIG. 1 is effective to close off the discharge of one of the clutches to the reservoir and further movement of the valve element 32 is effective to connect that clutch to the hydraulic fluid inlet while, at the same time, disconnecting one set of lubricating passageways from the source of pressurized fluid. Specifically, a first initial incremental movement of the valve element 40 in a forward direction to the right as illustrated in FIG. 2, is effective to bring the ring-shaped portion 67 of the valve element 32 into engagement with the wall of the valve cylinder 31 to prevent further discharge of the fluid from the forward clutch through the clutch control passageway 62 and into the enlarged open portion 70 of the valve cylinder 31. Moreover, further movement of the valve element 32 to the right, as illustrated in FIG. 3, is effective to connect the forward clutch to the pressurized hydraulic fluid through a series of ports and passageways including the fluid inlet fitting 17, inlet passageway 50, spaced inlet port 51, clutch control passageway 62, forward clutch port 56, forward clutch fluid passageway 57, forward clutch fitting 20, and fluid conduit 21. At the same time, the lubricating passageways 75 and 72 have been disconnected from the pressurized inlet fluid since the ring-shaped portion 65 of the valve element 32 has moved past the inlet port 51 closing off the supply of inlet fluid to this portion of the lubricating system. Movement of the valve element 32 in the opposite or reverse direction, that is, to the left, will, of course, be effective to connect the reverse clutch to the source of inlet fluid under pressure through the complementary set of grooves, passageways, and conduits.

As soon as the fluid requirements of the clutches 11 and 12 are satisfied, lubricating fluid is thereafter supplied to the lubricating system of the vehicle. Referring specifically to FIGS. 2 and 3, when the valve element 32 has been moved to the right, to the position illustrated in FIG. 3, lubricating fluid is supplied to the lubricating port 48 through the righthand passageways of the valve element 32 and valve cylinder 31. Specifically, lubricating fluid is supplied through the fluid inlet fitting 17, inlet passageway 50, inlet port 52, fluid passageway 60, lubricating passageway 76, lubricating passageway 73, expandable chamber 37, lubricating ports 40, lubricating manifold 42, and lubricating passageways 45, 46, and 47. Moreover, it will be appreciated that if the valve element 32 is moved to the extreme right, the fluid port 40 in the side walls of the expandable chamber 37 initially will be closed due to the passage of the piston portion 35 of the valve element 32 thereover. Accordingly, pressure will build up in the expandable chamber 37 sufficiently to move the valve element 32 to the left to at least partially open the lubricating port 40. Of course, if the valve element 32 is moved to the left, then the left-hand set of lubricating passageways are brought into effect to provide lubricating fluid to the lubricating system of the vehicle; and, similarly, the piston portion 33 of the valve element 32 will at least partially block the lubricating fluid passageways 38 to create a build-up of fluid pressure in the expandable chamber 36 sufficient to move the valve element to the right to at least partially uncover the port 38.

In order to move the valve element 32 to the preselected position and to counterbalance the build-up of pressure in the expandable chambers 36 and 37 thereby to spring-load the pressure to the clutches 11 and 12, there is provided a control system in the valve chamber 19 including an outer or control sleeve 80 slidably mounted in a control cylinder 81 formed in the lower portion of the valve chamber 19. A control piston 82 is positioned for slidable movement within the hollow interior of the control sleeve 80 and is interconnected for movement therewith by a double-acting loading or compression spring 83.

In order to move the control sleeve 80 a predetermined amount in either the forward or reverse directions, there is provided a clutch control element or fork 85 fixedly mounted on a control shaft 86 extending into the valve chamber 19. As is well known, the clutch control fork 85 is provided with a pair of bifurcated arms 87 provided near its end with confronting control buttons 88 which ride in a suitable groove 90 in the outer surface of the control sleeve 80. The control shaft 86 is connected (by means not shown) to be manually or otherwise pivotally positioned a selected amount in a predetermined direction to effect movement and control of the valve element 32. It will be appreciated that the control shaft 86 may be connected to hand- or foot-operated handles or treadles.

For the purpose of spring-loading the valve element 32 to counterbalance the pressure build-up in the expandable chambers 36 or 37, the control sleeve 80 is connected to the control piston 82 through the loading spring 83. Specifically, the loading spring 83 is provided at each end with an end bearing washer 91 and 92 slidably mounted on the control piston 82 and movable within a counterbore 93 of the control sleeve 80. The control piston 82 is provided with a C-ring 95 constituting a stop fitted into an annular ring 96 thereon and adapted to engage one of the end bearing washers 91. Additionally, the end bearing washer 91 is positioned to seat against a bottom surface 97 of the counterbore 93 constituting a stop. The outer end bearing washer 92 is restrained by a C-ring 98 constituting a stop fitted in an annular groove 100 within the counterbore 93. Additionally, a link sleeve 101 is slidably received on the control piston 82 and is movable within the C-ring 98 to engage the end bearing washer 92 of the loading spring 83 and constituting a stop therefor. The link sleeve 101 is fixed to the control link 77 as by welding, as indicated at 102. An additional C-ring 103 provided in an annular groove 105 in the control piston 82 limits the movement of the control link 77 to the right with reference to the control piston 82 as viewed in FIG. 1.

In operation when the control shaft 86 is pivoted so as to move the control sleeve 80 in either direction, the loading spring 83 will become effective through the control link 77 to bias the valve element 32 in the same direction as the control sleeve 80. For example, assuming that the control shaft 86 is rotated clockwise so as to slide the control sleeve 80 to the right as viewed in FIGS. 1 through 3, the loading spring 83 which is preloaded in compression initially will function as a solid connection with the control link 77 and will move the valve element 32 a corresponding distance as indicated in FIG. 2. However, once the valve element 32 has moved sufficiently far to totally or at least partially block the lubricating fluid ports 40 in the expandable chamber 37, pressure will build-up in the expandable chamber 37 which will react to move the valve element 32 back to the left to partially open the ports 40. Such pressure loading of the valve element 32 will be effective through the control link 77 to slide the link sleeve 101 to the left relative to the control sleeve 80 and the control piston 82, thereby further compressing the loading spring 83 as illustrated in FIG. 3. It is evident that the force exerted by the loading spring 83 must balance the pressure load against the valve element 32 due to the build-up of pressure in the expandable chamber 37. Since the movement of the valve element 32 to the left under the force of the pressure in the expandable chamber 37 partially unblocks the lubricating fluid port 40, the amount of pressure build-up within the expandable chamber 37 is regulated by the compression of the spring 83. Therefore the force exerted by the loading spring 83 will be proportional to the movement of the control sleeve 80 and control piston 82 to the right; that is, the amount of restraining or counterbalancing force exerted by the spring 83 will be a function of the compression of the spring 83, necessary to unblock the lubricating fluid port 40 in order to balance the spring and this will necessarily be a function of the distance that the spring 83 has been moved by the control sleeve 80 and the control piston 82.

Advantageously, the compression loading of the loading spring 83 and, consequently, the hydraulic pressure transmitted to the clutches 11 and 12, is transmitted through the control sleeve 80 and clutch control fork 85 to the control shaft 86 so that "feel" of the clutch system is provided for the operator of the vehicle. Moreover, if the control sleeve 80 is moved to an extreme right or left position, as when the clutch is completely engaged to directly couple the transmission of the vehicle to the engine thereof during normal driving of the vehicle without the desirability of inching the vehicle, then a holding ball 106 will be biased by a retaining spring 107 into one of a pair of holding detents 108 and 109 to maintain the control sleeve 80 and, accordingly, the valve element 32, in the fully engaged position.

When it is desired to move the vehicle in a reverse direction and the control shaft 86 accordingly is moved counterclockwise to shift the control sleeve 80 and control piston 82 to the left, as viewed in FIGS. 1, 2, and 3, the control piston 82 acting through the control link 77, will bias the valve element 32 to the left. However, once the valve element 32 has been moved to the left sufficiently far to at least partially close the lubricating fluid port 38 in the expandable chamber 36, a build-up of pressure will develop within the chamber 36 after the reverse clutch has been filled with fluid so that the pressure therein will return the valve element 32 to the right, moving the control piston 82 to the right through the C-ring 103 which in turn moves the control piston 82 and the C-ring 95 to the right unseating the end bearing washer 91 from the bottom surface 97 of the counterbore 93, thereby to springload the valve element 32 dependent upon the positioning of the control shaft 86.

Although the control shaft 86 may be quickly rocked clockwise and counterclockwise, to give a forward and reverse rocking motion to the vehicle, the clutches 11 and 12 and the vehicle transmission cannot respond instantly to such a change of direction, and, accordingly, a delay in the engagement of the clutches 11 and 12 is interposed in the system. This delay is readily accomplished by means of a dashpot arrangement 110 on the control piston 82.

To provide for the dashpot 110, the ends of the control piston 82 are each reciprocally received in respective cylinders 111 and 112 to form piston portions 111a and 112a. Each of the cylinders 111 and 112 are provided with fluid ports 113 and 115 respectively in their sidewalls positioned close to the piston portions 111a and 112a when the control piston 82 is in the neutral position illustrated in FIG. 1 and are adapted to be closed by the control piston 82 upon initial movement of the control piston 82 to the left or the right respectively. The ports 113 and 115 communicate between the respective cylinders 111 and 112 and the valve chamber 19 which, as heretofore described, is filled with suitable hydraulic fluid up to the level of the drain 26. Once the fluid ports 113 or 115 have been closed by movement of the control piston 82, then further movement of the control piston 82 necessitates the transfer of fluid from one cylinder 111 or 112 to the other of the cylinders through an axial passageway 116 in the control piston 82 connecting the cylinders 111 and 112. The axial passageway contains a flow restriction device 117, here shown as a reduced diameter orifice, to control the rate of transfer of hydraulic fluid between the cylinders 111 and 112. Accordingly, regardless of the speed at which the control shaft 86 is rocked between a forward and a reverse position, the above-described dashpot arrangement is effective to limit the rate of movement of the control piston 82 and consequently of the loading of the forward and reverse clutches. The loading spring 83 during such a rocking or swift-shifting operation acts as a lost-motion connection between the control sleeve 80 and the control piston 82 and absorbs the difference in travel between the control sleeve 80 and the control piston 82 by compression. This results in unseating of a respective one of the end bearing washers 91 or 92 of the loading spring 83. Continued travel of the control piston 82 through the dashpot 110 is effected by the expansion of the compressed loading spring 83.

In operation, when the actuating shaft 86 is rotated clockwise, as viewed in FIG. 1, the control piston 82 will move quickly to the right until the fluid ports 115 are closed. Then fluid trapped in the cylinder 112 must pass past the flow restriction device 117. Accordingly, the control piston will complete its movement to the right at a predetermined rate dependent upon the amount of restriction offered by the device 117. If the actuating shaft 86 has been rotated at a rate corresponding to a rate greater than the movement of the control piston 82, then the end bearing washer 92 on the loading spring 83 will unseat from the C-ring 98 and the end bearing washer 91 will unseat from the C-ring 95 as illustrated in FIG. 3; and further travel of the control piston 82 and valve element 32 will be under the control of the loading spring 83 as regulated by the flow restriction device 117. Moreover, if the control shaft 86 is rapidly rotated to the left either from its forward or neutral position, then the restriction to the flow through the passageway 116 created by the flow restriction device 117 will be effective to retard the movement of the control piston 82, and, accordingly, of the valve element 32 to the preselected rate. A quick motion of the control shaft 86 in a counterclockwise direction will cause the end bearing washer 92 to unseat from the link sleeve 101 and the end bearing washer 91 to unseat from the bottom surface 97 of the control sleeve 80; and further travel of the control piston 82 to the left will be under the control of the loading spring 83 as determined by the flow restriction device 117.

In order to return and maintain the above-described valve in the neutral position, accurately centered during the no-load conditions, whenever the control sleeve 80 is not locked in place by the holding ball 106, there is provided a single double-acting centering spring 118 effective to center the control sleeve 80 and, accordingly, the valve element 32. The centering spring 118 is provided at each end with an end bearing washer 120 and 121 respectively, one of which is moved in a spring compressing position when the control sleeve 80 is moved in either direction from the centered position. Specifically, the end bearing washer 120 seats against a stationary sleeve 122 constituting a stop and forming a part of the fixed housing 16 and, additionally, seats against a C-ring 123 constituting a stop and fitted in an annular groove 125 in a reduced diameter end portion 126 of the control sleeve 80. Moreover, the end bearing washer 121 is adapted to seat against a fixed shoulder 127 constituting a stop and formed at the end of the reduced diameter end portion 126 of the control sleeve 80 and, at the same time, seats against a shoulder 128 constituting a stop formed in the housing 16.

In operation, whenever the control sleeve 80 is moved to the right as viewed in FIG. 1, the C-ring 123 is effective to bear against the end washer 120 to unseat the end washer 120 from the stationary sleeve 122 to compress the centering spring 118. Similarly, when the control piston 82 is moved to the left of the neutral position illustrated in FIG. 1, the shoulder 127 on the control sleeve 80 will bear against the end bearing washer 121 to unseat the washer 121 from the shoulder 128 and compress the centering spring 118. Accordingly, the spring 118 is effective to maintain and return the control sleeve 80, and consequently, the valve element 32, to a neutral position wherein the end washers 120 and 121 simultaneously bear against both of their associated stops.

From the above detailed description of the invention, its operation is believed clear. However, briefly, it will be understood that when moved to the right, the valve element 32 is effective to fill and load the forward clutch 11 with hydraulic fluid through the arrangement of passageways as best illustrated in FIG. 3, and that when moved to the left, the valve element 32 is effective to fill and load the reverse clutch 12 with hydraulic fluid through the complementary set of passageways. Moreover, once the valve element has been moved to the right or to the left to engage the forward or reverse clutch respectively, the forward or reverse clutch 11 or 12 is first filled with fluid and then, since the fluid ports 38 or 40 to the lubricating system of the vehicle have been closed by the projection of the piston portion 33 or 35, fluid pressure will build up in the expandable chambers 36 and 37 to push the valve element 32 out of the respective expandable chambers 36 or 37 sufficiently far to open the respective ports. This pressure loading on the valve element 32 will be reacted through the control link 77 and link sleeve 101 to the loading spring 83. The amount of actuation of the control shaft 86, and, correspondingly, the positioning of the control piston 82, will determine the amount of force required to open the lubricating fluid ports 38 and 40 a sufficient distance to balance the hydraulic system at the preselected movement and, accordingly, the hydraulic pressure supplied to the clutches 11 and 12 will be dependent on the spring loading of the loading spring 83. Moreover, advantageously, this spring loading provides a feel through the control shaft 86 to an operator. Small increments of displacement of the control shaft 86 are effective to require a lesser compression of the loading spring 83 in order to unload the expandable chambers 36 and 37, and accordingly, will build up a lesser hydraulic pressure supplied to the clutches 11 and 12 then would result from a greater displacement of the control shaft 86. Accordingly, with small movements of the control shaft 86, the pressure supplied to the forward and reverse clutches is insufficient to completely engage the clutches and the clutches will slip. This permits the engine 15 to be run at a high rate while the transmission is actuated at a substantially slower rate due to the slippage of the clutches 11 and 12 and the vehicle may be inched or slowly moved forward or reverse as selected by the operator. Moreover, when the control shaft 86 is pivoted to its extreme right or left position, then the loading imposed on the selected clutch 11 or 12 can approach the pressure output of the pump 13, which in one particular embodiment, was in the area of 190 p.s.i. Since the loading and unloading of the forward and reverse clutches 11 and 12 is not instantaneous but requires a short delay interval, the control piston 82 of the control valve 10 is provided with a dashpot 110 including the flow restriction device 117 to prevent rapid engagement or disengagement of the clutches, and is particularly effective when the vehicle is rocked forward and reverse. During the delay in the actuation of the control piston 82, the loading spring 83 acts as a lost-motion connection to provide for relative delay between the control piston 82 and the control sleeve 80 and, additionally, is effective to drive the control piston 82 in the selected direction. It will be seen that a single loading spring 83 is required to springload the selected one of the forward or reverse clutches 11 or 12 and to provide for the lost-motion connection.

Moreover, according to another feature of the invention, the centering spring 118 is effective to return and maintain the control valve 10 to its neutral position illustrated in FIG. 1 from all clutch-loading positions except when the clutches are in the fully engaged position and held in place by the holding ball 116 in the holding detents 108 or 109.

Figure 4:
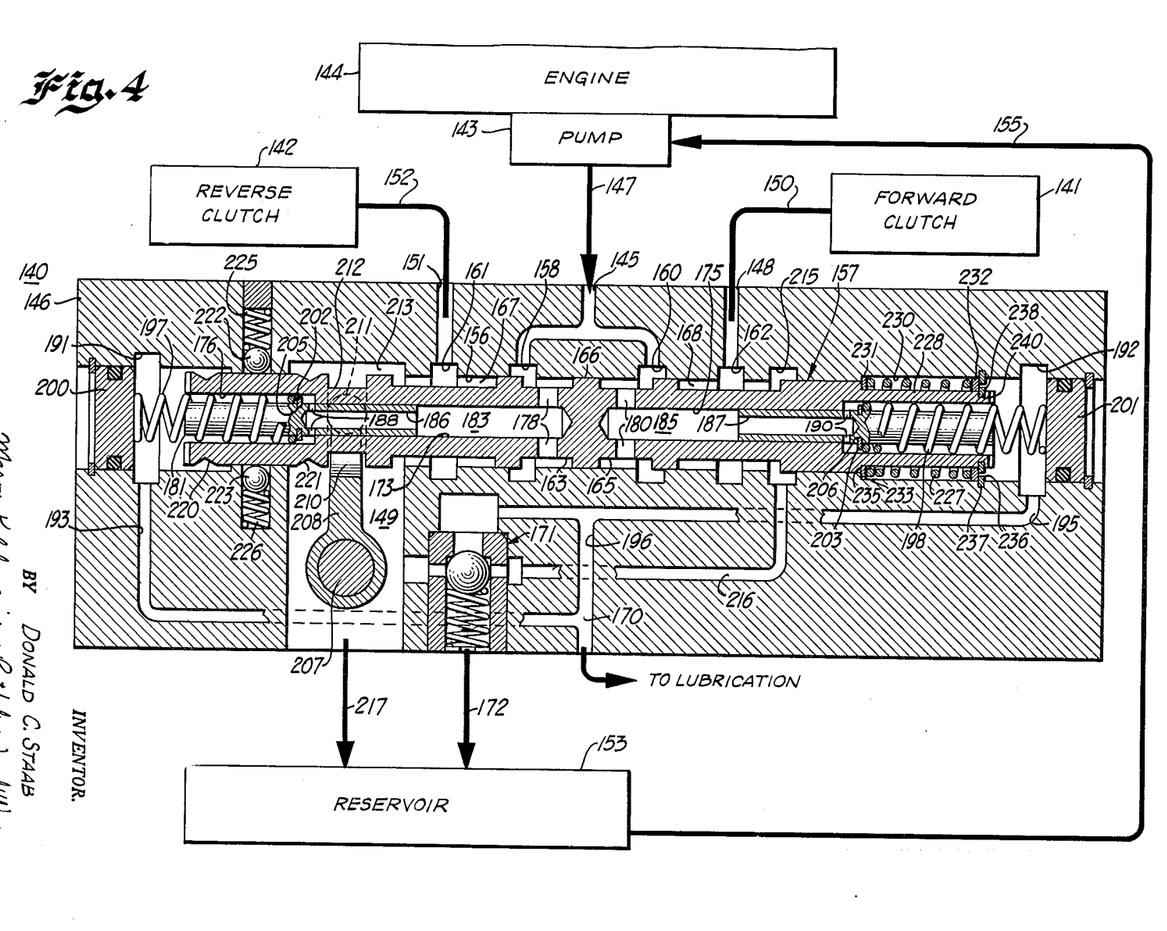
FIG. 4 is another embodiment of a transmission control system embodying the principles of the present invention and illustrating the transmission control valve thereof in cross section.

In FIG. 4 there is illustrated another embodiment of a transmission control system including a control valve 140 embodying the principles of the present invention, and, specifically, wherein the hydraulic pressure supplied to a forward clutch 141 and to a reverse clutch 142 is determined by the spring loading of the hydraulic system. Specifically, the control valve 140 of the transmission control system therein illustrated is adapted to be connected to a source of hydraulic fluid under pressure supplied by a transmission valve pump 143 driven from a prime mover such as an engine 144. The hydraulic fluid under pressure is supplied to a fluid inlet passageway 145 in a housing 146 of control valve 140 through a fluid conduit 147. The forward clutch is connected to a forward clutch passageway 148 in the housing 146 of the control valve 140 through a forward clutch conduit 150. The reverse clutch 142 is connected to a reverse clutch passageway 151 in the housing 146 of the control valve 140 through a reverse clutch conduit 152. The housing 146 forms a valve chamber 149 normally filled with hydraulic fluid and adapted to discharge surplus hydraulic fluid into a reservoir 153 from which it is drawn by the pump 143 through a pump supply conduit 155.

To provide for connecting the pump 143 to a selected one of the clutches 141 and 142, the valve chamber 149 includes a valve cylinder 156 reciprocally receiving a valve element 157. The arrangement of ports and passageways in the valve cylinder 156 and valve element 157 is similar to that heretofore described in connection with the embodiment of FIGS. 1 to 3 and, specifically, the inlet passageway 145 communicates with a pair of spaced inlet ports 158 and 160 formed in the cylinder 156 in the form of annular recesses or rings. Additionally, outwardly of each of the inlet ports 158 and 160 is a respective clutch port 161 and 162 communicating respectively with the reverse clutch passageway 151 and the forward clutch passageway 148, and having the general shape of an annular recess or ring. Moreover, the valve element 157 is provided with a pair of annular recesses or grooves 163 and 165 forming fluid passageways separated by a ring 166 reciprocally positioned between the inlet ports 158 and 160 continuously separating the inlet ports 158 and 160. Outwardly of the grooves 163 and 165 is another pair of grooves 167 and 168 in the form of an annular recess forming a reverse clutch passageway and a forward clutch passageway respectively.

To provide lubricating fluid for the vehicle, the control valve 140 is provided with a lubrication outlet port 170 adapted to be connected to the lubricating system of the vehicle to provide a low-pressure fluid source for the lubrication system. A pressure relief valve 171 is connected to the lubrication passageways in the valve 140 to control the pressure in the lubricating conduit and the pressure relief valve 171 discharges into the reservoir through a lubricating discharge conduit 172 to dispose of any excess flow to the lubricating system. Additionally, the lubricating passageways in the control valve 140 include a pair of axial lubricating passageways 173 and 175, extending into respective ends of the valve element 157, and each provided at its outer end with an enlarged counterbored portion 176 and 177 respectively. Each of the axial lubricating passageways 173 and 175 connects with a plurality of radial lubricating passageways 178 and 180 respectively which communicate with the annular passageways 163 and 165, respectively. Positioned in respective ones of the axial lubricating passageways 173 and 175 are a pair of pressure regulating pins 181 and 182 forming pistons which are respectively slidably mounted in the axial lubricating passageways 173 and 175 and which form expandable chambers 183 and 185 therewith. The pins 181 and 182 respectively are provided with axial passageways 186 and 187 terminating in radially outwardly extending lubricating fluid ports 188 and 190, respectively. When the control valve 140 is in the neutral position illustrated in FIG. 4, the fluid ports 188 and 190 open between the expandable chambers 183 and 185 into the enlarged counterbore portions 176 and 177 respectively. The enlarged counterbore portions 176 and 177 of the valve element 157 open into lubricating passageways 191 and 192 connecting to the lubricating outlet port 170 through intermediate lubricating passageways 193, 195, and 196. When the control valve 140 is in the neutral position illustrated in FIG. 4, two lubricating branches are formed, a first including the inlet passageway 145, inlet ports 158, groove 163 in the valve element 157, radial lubricating passageway 178, axial lubricating passageways 173 and 186, fluid port 188, enlarged counterbore portion 176 of the valve element 157, and the lubricating passageways 191, 193; a second lubricating passageway is formed to the right of the valve and including the inlet passageway 145, the inlet port 160, the groove 165, the radial lubricating passageway 180, the axial lubricating passageways 175 and 187, the fluid port 190, the enlarged counterbored portion 177 of the valve element 157, and the fluid passageways 192, 195 and 196. The pins 181 and 182, while axially slidable within the chambers 183 and 185, are maintained while the valve is in neutral position such that the fluid ports 188 and 190 are open into the counterbored enlarged portions 176 and 177 of the valve element 157. This is accomplished by a pair of respective helical loading springs 197 and 198 having one end respectively positioned against one of a pair of fixed plugs 200 and 201, respectively, of the valve housing 146 and having its other end bearing against one of a pair of C rings 202 and 203 respectively fitted into suitable recesses 205 and 206 respectively in the pins 181 and 182 respectively. The loading springs 197 and 198 are coiled around the outer ends of the pins 181 and 182 and are positioned at least partially within the enlarged counterbored portions 176 and 177 of the valve element 157. Moreover, the free length of the loading springs 197 and 198 is such that the ports 188 and 190 are maintained open, when the valve 140 is in neutral, that is, are maintained in communication between the respective expandable chambers 183 and 185 and the enlarged counterbored portions 176 and 177 of the valve element 157. It will be appreciated that upon initial movement of the valve element 157 to the left or right the fluid ports 188 and 190 will be at least partially closed or restricted by the wall of the axial fluid passageways 173 and 175 respectively.

To provide for movement of the valve element 157 in the desired direction, there is provided a control shaft 207 extending through the housing 146 of the control valve 140 into the valve chamber 149, and adapted to be manually rocked, for example, by a hand lever or a treadle. A control fork 208 is fixed to the shaft 207 and is provided with a pair of bifurcated arms 210 each provided with suitable inwardly extending protrusions or buttons 211 slidably riding in an annular groove 212 in the valve element 157. Pivoting of the control shaft 207 clockwise is effective to move the valve element 157 to the right, as viewed in FIG. 4 and pivoting of the control shaft 207 counterclockwise as viewed in FIG. 4 is effective to move the valve element 157 to the left.

In order to provide for unloading of the forward clutch 141 and reverse clutch 142 to the reservoir when the valve 140 is in neutral position, there is provided enlarged portions or chambers 213 and 215 outwardly of the clutch ports 161 and 162, respectively, in the wall of the valve cylinder 156. The chamber 215 is connected through a fluid conduit 216 to the chamber 213, each of which are adapted to discharge into the reservoir 153 through an outlet conduit 217.

In order to lock the valve element 157 in its extreme left- or right-hand position, thereby to maintain the forward clutch 141 or reverse clutch 142 respectively in its fully engaged position, the valve element 157 is provided with a pair of detents or V-shaped grooves 220 and 221 at one end thereof and the valve 140 includes a pair of diametrically opposed holding balls 222 and 223 biased toward the detents 220 and 221 by a pair of compression springs 225 and 226. The balls 222 and 223 are effective to engage within the detents 221 and 222 to hold and maintain the valve element 157 in a fully engaged clutch position.

In order to accurately center the valve element 157 in the valve cylinder 156, there is provided a centering spring 227 positioned between a reduced diameter portion 228 of the valve element 157 and a counterbored portion 230 of the valve cylinder 156. The centering spring 227 is provided at each end with respective bearing washers 231 and 232 respectively. The bearing washer 231 is adapted to seat when in the neutral position against a first shoulder 233 formed at the base of the counterbored portion 230 of the valve housing 140 and a second shoulder 235 formed at the base of the reduced diameter portion 228 of the valve element 157. The other end bearing washer 232 is adapted to seat against a first C-ring 236 fitted in an annular groove 237 in the counterbored portion 230 of the valve housing 144 and a second C-ring 238 fitted in an annular groove 240 in the counterbored portion 230 of the valve element 157. It will be understood that movement of the valve element 157 either to the left or right from the neutral position is effective to compress the centering spring 227 in a manner similar to that heretofore described in connection with the embodiment of FIGS. 1 to 3, and the centering spring 227 is therefore continuously effective to bias the valve element 157 in the neutral position illustrated in FIG. 4.

From the foregoing description the operation of the improved control valve 140 is believed clear. Moreover, the operation thereof embodies the principles heretofore set forth in detail in connection with the embodiment of FIGS. 1 to 3. However, briefly, it will be understood that with the valve element 157 in a neutral position, as illustrated in FIG. 4, lubricating oil is free to flow through the lubricating passageways heretofore set forth and to be discharged from the lubrication outlet port 170 to the lubricating system of the vehicle. Any excess fluid supplied to the lubrication system will be discharged through the pressure relief valve 171. It is, of course, understood that the lubrication system of the vehicle is a low-pressure system and, accordingly, the pressure relief valve 171 is set at a very low value compared to the output of the pump 143. Movement of the element 157 to either the left or the right will be effective to close one branch of the lubricating system to the source of input fluid and, additionally, will serve to connect a respective one of the clutches 141 and 142 to the input system. For example, movement of the valve element 157 to the right, as viewed in FIG. 4, will be effective to move the passageway 163 on the valve element 157 out of communication with the inlet port 158 and, accordingly, close off the lubrication branch including the radial lubricating ports 178. At the same time, the passageway 167 will connect the inlet port 158 with the reverse clutch port 161 and, accordingly, will supply inlet fluid to the reverse clutch. This movement of the valve element 157 to the right will additionally be effective to block off the lubricating ports 190 to the expandable chamber 185. Once the requirement of fluid to the clutch has been satisfied, then pressure will build up in the expandable chamber 185 so as to move the pin 182 outwardly of the expandable chamber 185 against the return bias of the loading spring 198 to at least partially open the fluid ports 190. The pressure build-up in the expandable chamber 185 will, of course, be a function of the amount of compression to the loading spring 198 and, consequently, will be determined by the distance that the valve element 157 has been moved to the right. This pressure build-up in the expandable chamber 185 results in a pressure build-up in the inlet pressure from the pump 143 and, accordingly, the pressure is transmitted to the reverse clutch 142. If it is desired to completely engage the clutch so as to solidly connect the transmission to the engine, the valve element 157 would, of course, be shifted completely to the right as viewed in FIG. 4 until the holding balls 222 and 223 fit into the detent 220. In this position the compression load characteristic of the spring 198 is such as substantially to make the complete pressure output of the pump 143 available for loading the reverse clutch.

It will be understood that movement of the valve element 157 to the left will block the lubricating passageways to the right of the valve element 157 as viewed in FIG. 4, and, at the same time, will be effective to connect the forward clutch 141 to the hydraulic system.

When the valve element 157 is returned to a neutral position, the respective clutches 141 and 142 will be discharged to the reservoir. The forward clutch 141, for example, will discharge through the forward clutch conduit 150, the clutch passageway 148, clutch port 162, groove 168, chamber 215, and fluid conduit 216 into the fluid conduit 213 which communicates with the output conduit 217. The reverse clutch 142 is discharged to the reservoir through the reverse clutch conduit 152, the clutch passageway 151, the clutch port 161, the groove 167, and the fluid conduit 213 leading to the outlet conduit 217.

As above described, any desired pressure loading of the forward or reverse clutches 141 and 142, may be had by the proper positioning of the valve element 157 through pivotal positioning of the control shaft 207. Moreover, the pressure established in the respective expandable chambers 183 and 185 and transmitted to the forward and reverse clutches 141 and 142 creates a feel on the control shaft 207 so that the vehicle embodying the present transmission control system may be accurately inched at a slow rate of speed in either the forward or reverse direction regardless of the speed of the engine 145.

While certain preferred embodiments of the invention have been described by way of illustration, many modifications will occur to those skilled in the art. It is therefore intended in the appended claims to cover all such modifications as fall within the true spirit and scope of the invention.

What is claimed as new and desired to be secured by Letters Patent of the United States is:

1. Control valve means for selectively actuating forward and reverse clutches of a truck transmission to provide inching of the truck and comprising a valve housing having a valve chamber including a valve cylinder, a valve element slidably mounted in said cylinder, first passageway means communicating with said valve cylinder for connection to a source of hydraulic fluid under pressure, means in said valve chamber including said valve element forming a first expandable chamber, means in said valve chamber including said valve element forming a second expandable chamber, a first passageway in said valve element for interconnecting said first passageway means and said first expandable chamber, a second passageway in said valve element for interconnecting said first passageway means and said second expandable chamber, second passageway means communicating with said first and second expandable chambers for connection to the lubricating system of the truck and including a first port in said first expandable chamber and a second port in said second expandable chamber, said first port being at least partially closed upon movement of said valve element in a first direction and said second port being at least partially closed by movement of said valve element in a second direction; third passageway means communicating with said valve cylinder for connection to a first fluid actuated clutch, fourth passageway means communicating with said valve cylinder for connection to a second fluid actuated clutch, means including said valve element for placing said first passageway selectively in communication with said third and fourth passageway means, said valve element being provided with means for maintaining said first passageway means and said first expandable chamber in communication when said valve element is moved in said first direction and closing said first passageway means relative to said first expandable chamber when said valve element is moved in said second direction and additionally provided with means maintaining said first passageway means and said second expandable chamber in communication when said valve element is moved in said second direction and closing said first passageway means relative to said second expandable chamber when said valve is moved in said first direction, actuating means operable to move said valve element in said first and second directions toward a position to contract said expandable chambers to close said first and second ports respectively to provide a pressure build-up in the respective one of said chambers which tends to expand said chambers, and spring means connected to resiliently restrain the expansion of said expandable chambers due to the pressure therein so as to at least partially maintain open said first and second ports respectively until the pressure in the associated expandable chamber is in equilibrium with the restraining force of the spring means, the restraining force of said spring means being a function of the distance through which actuating means is moved.

2. Control valve means for selectively actuating forward and reverse clutches of a truck transmission to provide inching of said truck and comprising a valve housing having a valve chamber including a valve cylinder, a valve element slidably mounted in said cylinder, first passageway means communicating with said valve cylinder for connection to a source of hydraulic fluid under pressure, means in said valve chamber including said valve element forming a first expandable chamber, means in said valve chamber including said valve element forming a second expandable chamber, a first passageway in said valve element for interconnecting said first passageway means and said first expandable chamber, a second passageway in said valve element for interconnecting said first passageway means and said second expandable chamber, second passageway means communicating with said first and second expandable chambers adapted for connection to the lubricating system of a truck and including a first port in said first expandable chamber and a second port in said second expandable chamber, said first port being at least partially closed upon movement of said valve element in a first direction and said second port being at least partially closed by movement of said valve element in a second direction; third passageway means communicating with said valve cylinder adapted for connection to a first fluid actuated clutch, fourth passageway means communicating with said valve cylinder adapted for connection to a second fluid actuated clutch, said valve element being provided with means maintaining said first passageway means and said first expandable chamber in communication when said valve element is moved in said first direction and closing said first passageway means relative to said first expandable chamber in communication when said valve element is moved in said second direction and additionally provided with means maintaining said first passageway means and said second expandable chamber in communication when said valve element is moved in said second direction and closing said first passageway means relative to said second expandable chamber when said valve is moved in said first direction, and additionally provided with means placing said first and third passageway means in communication when said valve element is moved in said first direction and placing said first and fourth passageway means in communication when said valve element is moved in said second direction, actuating means operable to move said valve element in a selected one of said first and second directions toward a position to contract said expandable chambers to close said first and second ports respectively to provide a pressure build-up in the respective one of said chambers which tends to expand said chambers, and spring means connected to resiliently restrain the expansion of said expandable chambers due to the pressure therein so as to at least partially maintain open said first and second ports respectively when the pressure in the associated expandable chamber is in equilibrium with the restraining force of the spring means, the restraining force of said spring means being a function of the distance through which actuating means is moved.

3. Control valve means for selectively actuating forward and reverse clutches of a truck transmission to provide inching of said truck and comprising a valve housing having a valve chamber including a valve cylinder forming expandable chambers at each end, a valve element slidably mounted in said cylinder and including piston portions at each end slidably received in said expandable chambers, first passageway means communicating with said valve cylinder for connection to a source of hydraulic fluid under pressure and including a pair of spaced inlet ports in said valve cylinder, a first passageway in said valve element for interconnecting a first one of said inlet ports and a first one of said expandable chambers, a second passageway in said valve element for interconnecting a second one of said inlet ports and a second one of said expandable chambers, second passageway means communicating with said first and second expandable chambers adapted for connection to the lubricating system of a truck and including a first lubricating port in a side wall of said first expandable chamber and a second lubricating port in a side wall of said second expandable chamber, said first port being closed by a first one of said piston portions upon movement of said valve element in a first direction and said second port being closed by a second one of said piston portions upon movement of said valve element in a second direction; third passageway means communicating with said valve cylinder adapted for connection to a first fluid actuated clutch and including a first clutch port spaced outwardly of said first inlet port, a fourth passageway means communicating with said valve cylinder adapted for connection to a second fluid actuated clutch and including a second clutch port spaced outwardly of said second inlet port, said valve element being provided with means placing said first inlet port in communication with said first passageway and placing said second inlet port in communication with said second clutch port and discharging said first clutch port into said valve chamber when said valve element is moved in said first direction and placing said second inlet port in communication with said second passageway and placing said first inlet port in communication with said first clutch port and discharging said second clutch port into said chamber when said valve element is moved in said second direction, actuating means operable to move said valve element in said first and second directions to close said first and second ports respectively to provide a build-up of fluid pressure in a respective one of said expandable chambers to expand said chamber, and spring means connected to resiliently restrain the expansion of said expandable chambers due to the pressure therein so as to at least partially maintain open said first and second ports respectively when the pressure in the associated expandable chamber is in equilibrium with the restraining force of the spring means, the restraining force of said spring means being a function of the distance through which actuating means is moved.

4. Control valve means as set forth in claim 3 above wherein said spring means includes a single double-acting compression spring.

5. A control valve as set forth in claim 3 above wherein said valve chamber additionally includes a control cylinder spaced from said valve cylinder and wherein said actuating means includes a control sleeve slidably received in the control cylinder and a control piston slidably mounted in the control sleeve interconnected therewith by the said spring means, and link means interconnecting said control piston and said valve element.

6. A control valve as set forth in claim 5 above wherein said spring means comprises a double-acting compression spring and wherein said control sleeve is provided with stops for engaging opposite ends of said spring and said control piston is provided with a stop for engaging one end of said spring and with a second stop for engaging said link, and including a link sleeve interposed between said link and the other end of said spring.

7. A control valve as set forth in claim 6 above whereing said spring is initially precompressed.

8. Control valve as set forth in claim 3 above and additionally including a pressure relief valve in said second passageway means adapted to discharging excess hydraulic fluid supplied to the lubricating system of said truck and set to release at a pressure substantially below the pressure of said hydraulic fluid source.

9. Control valve means as set forth in claim 3 above and additionally including dashpot means connected to retard rapid movement of said valve element into said first and second positions.

10. Control valve means as set forth in claim 5 above and additionally including a pair of spaced opposed cylinders, and wherein said control piston is provided with piston portions at its ends slidably received in respective ones of the last-mentioned cylinders, said last-mentioned cylinders being provided with ports in their side walls communicating with said chamber and adapted to be closed by movement of a respective piston portion into its associated cylinder, said control piston being provided with a passageway communicating between said last-mentioned cylinders, and flow restriction means in said passageway.

11. Control valve means as set forth in claim 10 above wherein said spring means is positioned between said control sleeve and said control piston serving as a lost-motion connection for said dashpot means.

References Cited by the Examiner

UNITED STATES PATENTS

| | | | |
|---|---|---|---|
| 2,301,099 | 11/42 | Upp | 192—87 XR |
| 2,774,257 | 12/56 | Tyler. | |
| 2,844,043 | 7/58 | Hobbs | 192—87 XR |
| 2,852,959 | 9/58 | Isaacson | 74—754 |
| 2,925,156 | 2/60 | Grant | 192—.98 |

OTHER REFERENCES

Ser. No. 400,817, Maybach (A.P.C.), published May 18, 1943.

DAVID J. WILLIAMOWSKY, *Primary Examiner.*

ROBERT C. RIORDON, *Examiner.*